United States Patent Office 3,639,664
Patented Feb. 1, 1972

3,639,664
MONOGLYCOL ETHER DERIVATIVES OF
ALUMINUM HALIDES
Horst W. Schmank, Ringgold, Ga., and Benjamin H. Gross, Chattanooga, Tenn., assignors to Chattem Chemicals, Division of Chattem Drug & Chemical Company, Chattanooga, Tenn.
No Drawing. Filed Feb. 25, 1969, Ser. No. 802,271
Int. Cl. C07f 5/06
U.S. Cl. 260—448 AD         6 Claims

ABSTRACT OF THE DISCLOSURE

Monoglycol ether derivatives of aluminum having the formula:

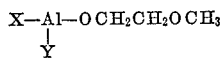

where X is a chloride, bromide or iodide ion, and Y is either a glycol ether group ($OCH_2CH_2OR$ where R has from 1–4 carbon atoms) or an alkoxy radical containing from 1 to 18 carbon atoms are disclosed which are useful as intermediates for the synthesis of alkoxyaluminum hydrides and as antiperspirants.

BACKGROUND OF THE INVENTION

Field of the invention

This invention is in the field of organo-aluminum compounds which are particularly useful as intermediates for the synthesis of alkoxyaluminum hydrides which are becoming extensively used as selective catalysts and selective reducing agents, as intermediates for other chemical compounds and as antiperspirants.

DESCRIPTION OF THE PRIOR ART

There has been a considerable amount of activity recently in studying the selectively and mechanisms of alkoxyaluminum hydride reductions. These agents, however, are difficult to prepare in high yields. The usual synthesis for alkoxyaluminum hydrides involves the reaction of aluminum hydride and a corresponding alcohol in tetrahydrofuran. Other methods for the production of these reagents involve the use of high pressure reactions, and are therefore expensive in terms of time and equipment.

SUMMARY OF THE INVENTION

The present invention provides halo-aluminum monoglycol ether derivatives from which alkoxyaluminum hydrides can be conveniently synthesized. The reactions under which the new halo aluminum compounds are formed take place at only moderately elevated temperatures and at atmospheric pressures. The starting materials are inexpensive reagents such as aluminum chloride, an aluminum alcoholate, and, optionally, aluminum metal.

The most economical synthesis for the compound chloro aluminum bis-methoxyethoxide involves reacting anhydrous aluminum chloride in an alcoholic or hydrocarbon solution with an aluminum alcoholate containing from 2 to 5 carbon atoms in each of its alcoholate groups. The mixture is heated to reflux conditions and then the resulting reaction product is treated with stoichiometric quantities or with a moderate excess of ethylene glycol monomethyl ether ("Methyl Cellosolve"). After removal of the alcohol medium and any added solvent, the remaining reaction product contains a substantial yield of the compound chloro aluminum bis-methoxyethoxide. The ethylene glycol monomethyl ether may be replaced by other ethylene glycol ethers containing a total of up to six carbon atoms to provide the corresponding ethyl, propyl and butyl derivatives.

The compounds of the present invention are highly reactive and selective in their reactivity. The chloro compound reacts selectively with customary reactants such as alkaline metal salts, alkoxides or hydrides to replace the halogen group. This selective reactivity produces higher yields of the desired product than do the non-halogenated compounds.

DESCRIPTION OF THE PREFERRED EMBODIMENTS

As previously noted, the compounds of the present invention include one or more glycol ether groups containing a total of from three to six carbon atoms per group. Where only one glycol ether group is present, the remaining valence of the aluminum is satisfied by attachment to an alkoxy radical OR' in which R' is an alkyl group containing from one to eighteen carbon atoms and preferably from two to four carbon atoms. The following specific examples illustrate the preparation of representative members of each class of compounds but it will be recognized that the same type of synthesis can be used with derivatives other than the chloro derivatives, with other ethylene glycol ethers, and with alcoholates other than the preferred aluminum isopropoxide.

EXAMPLE 1

One gram molecular weight of aluminum isopropoxide liquid was placed in a reaction vessel and one mole equivalent of hydrogen chloride in anhydrous isopropanol (calculated by normality) was added carefully, to form chloro aluminum diisopropoxide. After refluxing this mixture for a short time, the heat was removed and one gram molecular weight of "Methyl Cellosolve" was added in approximately five minutes. The mixture was heated again and all isopropanol was removed by distillation, after which the reaction product was heated to 145 to 150° C. The theoretical yield for the compound chloro aluminum isopropoxide methoxyethoxide from this reaction was 196.5 grams. The typical yield of the reaction product from this synthesis was from 195 to 200 grams.

EXAMPLE 2

One gram molecular weight of aluminum isopropoxide liquid was placed in a reaction vessel and one mole equivalent of hydrogen chloride in anhydrous isopropanol was added carefully, to form chloro aluminum diisopropoxide. After refluxing this mixture for a short time, the heat was removed and two gram molecular weights of "Methyl Cellosolve" plus a five gram excess was added in approximately five minutes. The mixture was heated again and the isopropanol was removed by distillation whereupon the reaction product was heated to 155 to 160° C. The theoretical yield of the compound chloro aluminum bis-methoxyethoxide was 212.7 grams. The typical yield in this example was 210 to 215 grams.

EXAMPLE 3

One gram molecular weight of anhydrous aluminum chloride was carefully added with stirring to 700 ml. of isopropanol and two gram molecular weights of liquid aluminum isopropoxide. The mixture was then refluxed for one hour to form monochloro aluminum diisopropoxide by equilibration. Subsequently, six gram molecular weights plus a ten to twenty gram excess of "Methyl Cellosolve" were added slowly. The isopropyl alcohol was removed by distillation, and the mixture was heated up to 155 to 160° C. The yield was 620 to 640 grams of a viscous liquid consisting predominantly of the compound chloro aluminum bis-methoxyethoxide.

EXAMPLE 4

This example is carried out the same as Example 3 except two gram molecular weights of aluminum metal were substituted for the two gram molecular weights of aluminum isopropoxide. The aluminum metal was dissolved by refluxing very slowly, with the evolution of hydrogen to form the chloro aluminum diisopropoxide. This product was then reacted with "Methyl Cellosolve" as in Example 3 to produce the compound chloro aluminum bis-methoxyethoxide.

The compound produced in Examples 2 to 4, inclusive, can be used as a starting material for the preparation of the compound sodium aluminum bis-methoxyethoxide hydride, a compound which is disclosed in French Pat. No. 1,515,582. The compound can also be used as an antiperspirant agent.

EXAMPLE 5

One mole equivalent (180.5 gm.) of chloro aluminum diisopropoxide was dissolved in 300 ml. of dry benzene and 157 grams (2 moles plus a 5 gram excess) of "Methyl Cellosolve" was added carefully. The replaced isopropanol was removed by heating the solution to distill off the isopropanol-benzene azeotropic mixture, leaving a solution of chloro aluminum bis-2-methoxyethoxide in benzene. This solution can be used directly as an intermediate for manufacturing other compounds or the benzene can be removed by evaporation to yield the pure compound.

We claim as our invention:

1. A compound having the formula:

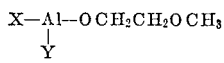

where X is a halogen selected from the group consisting of chlorine, bromine, and iodine, Y is a radical selected from the group consisting of a glycol ether group and an alkoxy radical OR' in which R' is an alkyl group containing from 1 to 18 carbon atoms.

2. The compound of claim 1 in which R' is an alkyl group containing from 2 to 4 carbon atoms.

3. The compound chloro aluminum bis-methoxyethoxide.

4. The compound chloro aluminum isopropoxide methoxyethoxide.

5. The method of making the compound chloro aluminum bis-methoxyethoxide which comprises reacting anhydrous aluminum chloride in a solvent with an aluminum alcoholate in the absence of water under reflux conditions, reacting the resulting reaction product with ethylene glycol monomethyl ether and removing the alcohol to leave a reaction product comprising said compound.

6. The method of claim 5 in which said solvent is isopropanol and said alcoholate is the isopropoxide.

References Cited

UNITED STATES PATENTS

| | | | |
|---|---|---|---|
| 1,630,593 | 5/1927 | Young | 260—448 AO |
| 2,796,326 | 6/1957 | Kimberlin, Jr., et al. | 260—448 AO UX |
| 2,823,144 | 2/1958 | Dalton | 260—448 AO X |
| 2,823,169 | 2/1958 | Brown, Jr., et al. | 260—448 AO X |
| 3,359,169 | 12/1967 | Slater, Jr., et al. | 260—448 AO X |
| 3,444,226 | 5/1969 | Schmank et al. | 260—448 AO |

FOREIGN PATENTS

| | | | |
|---|---|---|---|
| 806,182 | 12/1958 | Great Britain | 260—448 AO |

TOBIAS E. LEVOW, Primary Examiner

H. M. S. SNEED, Assistant Examiner

U.S. Cl. X.R.

252—431 R; 260—999